UNITED STATES PATENT OFFICE.

BENJAMIN C. TILGHMAN AND RICHARD A. TILGHMAN, OF PHILADELPHIA, PENNSYLVANIA.

CHILLED-IRON GLOBULE.

SPECIFICATION forming part of Letters Patent No. 446,988, dated February 24, 1891.

Application filed March 17, 1890. Serial No. 344,234. (Specimens.)

*To all whom it may concern:*

Be it known that we, BENJAMIN C. TILGHMAN and RICHARD A. TILGHMAN, both of the city and county of Philadelphia, State of Pennsylvania, have invented a certain new and useful Improvement in Chilled-Iron Globules, of which the following is a true and exact description, reference being had to the accompanying drawings, which form a part of this specification.

Our invention relates to the manufacture of chilled-iron globules such as are used in the process of abrasion described in B. C. Tilghman's patent, Reissue No. 7,499, dated February 6, 1877, and also to some extent in the sand-blast process. These globules are manufactured by atomizing a stream of melted iron by means of a jet of high-pressure steam or gas in such a way that they will remain in the air for a time long enough for them to assume a spherical form and chill on the surface, so as to take a permanent set or form. The still intensely-hot globules are then permitted to fall into a tank of water, where they are chilled to an intense hardness. They are then removed from the water and dried preparatory to packing them for shipment. At two stages of this method of manufacture the globules are exposed to a rapid oxidation—namely, when the melted iron is sprayed in the air, when a burning action takes place on the surface of the globules, with formation of a crust or scales of oxide, and during the process of drying, when a dark-red friable coat of rust forms upon them.

In the treatment of some delicate stones trouble has been met with from the rust-coating of the globules staining the surface, and where the globules are used for frosting metal the rust is driven into the metal under treatment, discoloring and injuring the surface. The coating is also unsightly, and, owing to its friable nature, it soils anything it comes in contact with.
The object of our invention is to furnish the globules with a bright clean metallic surface, while retaining the desirable physical qualities they have heretofore had. Of several methods for obtaining the globules of this kind with which we have experimented the following is, we believe, the best: We spray the melted metal in a non-oxidizing atmosphere, one, for instance, from which the oxygen has been eliminated, as by passing air through a deep bed of ignited fuel. This prevents the direct oxidation of the globules of melted metal and they fall into the water-tank with bright surfaces. The globules, while covered by water, are not subject to any noticeable oxidation; but preferably we dissolve a little lime or other alkali in said water. We then remove the globules from the tank and pour over them a solution of lime in water, which should preferably contain a small proportion of finely-divided hydrate of lime in suspension. This lime-water or dilute whitewash displaces the plain water, and the globules may after this treatment be safely handled and dried without danger of rusting. The reason for this is because the oxygen of the air is unable to rust an iron surface even in presence of water without the presence of free carbonic acid in solution, and free carbonic acid is of course impossible in a solution containing lime or other alkali in excess, for the carbonic acid combines with the alkali, forming, for instance, carbonate of lime, and the free lime in suspension then dissolves, maintaining the saturation of the solution, this chemical action going on until the globules are entirely dry and free from any considerable danger of rusting, even if their protecting shield of alkali was absent, which it is not, as of course a film of lime is deposited over them. Of course the chilling-tank may be filled with the dilute whitewash and the globules dried immediately on removal; but the use of the lime-water or whitewash, as described, is more economical, and for other reasons we believe preferable.

Instead of using the lime-water to prevent rusting, the globules may be dried in a non-oxidizing atmosphere with the same results, except as to the formation of the lime-film.

Having now described our invention, what we claim as new, and desire to secure by Letters Patent, is—

1. As a new article of manufacture, a chilled-iron globule having an unpolished but chilled and hardened bright unoxidized metallic surface.

2. As a new article of manufacture, a chilled-iron globule having an unpolished but chilled and hardened bright unoxidized metallic surface with a protecting film of lime deposited upon it.

B. C. TILGHMAN.
R. A. TILGHMAN.

Witnesses as to B. C. Tilghman:
ARTHUR C. HALL,
HENRY BLAIR,
9 Mount St., Manchester Witnesses as to R. A. Tilghman:
LEWIS R. DICK,
JOSHUA MATLACK, Jr.